(12) United States Patent
Kalavar

(10) Patent No.: US 8,116,446 B1
(45) Date of Patent: Feb. 14, 2012

(54) AGENT DRIVEN WORK ITEM AWARENESS FOR TUNING ROUTING ENGINE WORK-ASSIGNMENT ALGORITHMS

(75) Inventor: Rajeev P. Kalavar, San Jose, CA (US)

(73) Assignee: Avaya Inc., Basking Ridge, NJ (US)

( * ) Notice: Subject to any disclaimer, the term of this patent is extended or adjusted under 35 U.S.C. 154(b) by 1195 days.

(21) Appl. No.: 11/243,435

(22) Filed: Oct. 3, 2005

(51) Int. Cl.
*H04M 3/00* (2006.01)

(52) U.S. Cl. .............................. 379/265.13; 379/265.01

(58) Field of Classification Search ............. 379/265.02, 379/265.13, 265.01
See application file for complete search history.

(56) References Cited

U.S. PATENT DOCUMENTS

| | | | |
|---|---|---|---|
| 4,163,124 A | 7/1979 | Jolissaint | |
| 4,567,323 A | 1/1986 | Lottes et al. | |
| 4,737,983 A | 4/1988 | Frauenthal et al. | |
| 4,797,911 A | 1/1989 | Szlam et al. | |
| 4,894,857 A | 1/1990 | Szlam et al. | |
| 5,001,710 A | 3/1991 | Gawrys et al. | |
| 5,008,930 A * | 4/1991 | Gawrys et al. | 379/265.11 |
| 5,097,528 A | 3/1992 | Gursahaney et al. | |
| 5,101,425 A | 3/1992 | Darland et al. | |
| 5,155,761 A | 10/1992 | Hammond | |
| 5,164,983 A | 11/1992 | Brown et al. | |
| 5,206,903 A | 4/1993 | Kohler et al. | |
| 5,210,789 A | 5/1993 | Jeffus et al. | |
| 5,274,700 A | 12/1993 | Gechter et al. | |
| 5,278,898 A | 1/1994 | Cambray et al. | |
| 5,291,550 A | 3/1994 | Levy et al. | |
| 5,299,260 A | 3/1994 | Shaio | |
| 5,309,513 A | 5/1994 | Rose | |
| 5,335,268 A | 8/1994 | Kelly, Jr. et al. | |
| 5,335,269 A | 8/1994 | Steinlicht | |
| 5,390,243 A | 2/1995 | Casselman et al. | |
| 5,436,965 A | 7/1995 | Grossman et al. | |
| 5,444,774 A | 8/1995 | Friedes | |
| 5,469,503 A | 11/1995 | Butensky et al. | |
| 5,469,504 A | 11/1995 | Blaha | |
| 5,473,773 A | 12/1995 | Aman et al. | |
| 5,479,497 A | 12/1995 | Kovarik | |
| 5,500,795 A | 3/1996 | Powers et al. | |
| 5,504,894 A | 4/1996 | Ferguson et al. | |
| 5,506,898 A | 4/1996 | Costantini et al. | |
| 5,530,744 A | 6/1996 | Charalambous et al. | |
| 5,537,470 A | 7/1996 | Lee | |
| 5,537,542 A | 7/1996 | Eilert et al. | |

(Continued)

FOREIGN PATENT DOCUMENTS

CA 2143198 1/1995

(Continued)

OTHER PUBLICATIONS

U.S. Appl. No. 09/235,065, Denton et al.

(Continued)

*Primary Examiner* — Rasha Al Aubaidi
(74) *Attorney, Agent, or Firm* — Sheridan Ross P.C.

(57) ABSTRACT

Architecture for providing deductive context to a contact center routing engine is provided. Specifically, when a first interaction or set of interactions is received by a first agent and that agent cannot handle part or all of those interactions, before sending those interactions back to the routing engine, the agent can provide additional information enabling the routing engine to use the information when determining the next optimal resource for the grouped interactions.

20 Claims, 8 Drawing Sheets

U.S. PATENT DOCUMENTS

| | | |
|---|---|---|
| 5,544,232 A | 8/1996 | Baker et al. |
| 5,546,452 A | 8/1996 | Andrews et al. |
| 5,592,378 A | 1/1997 | Cameron et al. |
| 5,592,542 A | 1/1997 | Honda et al. |
| 5,594,726 A | 1/1997 | Thompson et al. |
| 5,606,361 A | 2/1997 | Davidsohn et al. |
| 5,611,076 A | 3/1997 | Durflinger et al. |
| 5,627,884 A | 5/1997 | Williams et al. |
| 5,642,515 A | 6/1997 | Jones et al. |
| 5,684,870 A * | 11/1997 | Maloney et al. ......... 379/212.01 |
| 5,684,872 A | 11/1997 | Flockhart et al. |
| 5,684,874 A | 11/1997 | Yagyu et al. |
| 5,684,964 A | 11/1997 | Powers et al. |
| 5,689,698 A | 11/1997 | Jones et al. |
| 5,703,943 A | 12/1997 | Otto |
| 5,713,014 A | 1/1998 | Durflinger et al. |
| 5,717,747 A | 2/1998 | Boyle, III et al. |
| 5,717,835 A | 2/1998 | Hellerstein |
| 5,724,092 A | 3/1998 | Davidsohn et al. |
| 5,740,238 A | 4/1998 | Flockhart et al. |
| 5,742,675 A | 4/1998 | Kilander et al. |
| 5,748,468 A | 5/1998 | Notenboom et al. |
| 5,749,079 A | 5/1998 | Yong et al. |
| 5,751,707 A | 5/1998 | Voit et al. |
| 5,752,027 A | 5/1998 | Familiar |
| 5,754,639 A | 5/1998 | Flockhart et al. |
| 5,754,776 A | 5/1998 | Hales et al. |
| 5,754,841 A | 5/1998 | Carino, Jr. |
| 5,757,904 A | 5/1998 | Anderson |
| 5,790,677 A | 8/1998 | Fox et al. |
| 5,794,250 A | 8/1998 | Carino, Jr. et al. |
| 5,796,393 A | 8/1998 | MacNaughton et al. |
| 5,802,282 A | 9/1998 | Hales et al. |
| 5,818,907 A | 10/1998 | Maloney et al. |
| 5,825,869 A | 10/1998 | Brooks et al. |
| 5,828,747 A | 10/1998 | Fisher et al. |
| 5,838,968 A | 11/1998 | Culbert |
| 5,839,117 A | 11/1998 | Cameron et al. |
| 5,875,437 A | 2/1999 | Atkins |
| 5,880,720 A | 3/1999 | Iwafune et al. |
| 5,881,238 A | 3/1999 | Aman et al. |
| 5,884,032 A | 3/1999 | Bateman et al. |
| 5,889,956 A | 3/1999 | Hauser et al. |
| 5,897,622 A | 4/1999 | Blinn et al. |
| 5,903,641 A | 5/1999 | Tonisson |
| 5,903,877 A | 5/1999 | Berkowitz et al. |
| 5,905,792 A | 5/1999 | Miloslavsky |
| 5,905,793 A | 5/1999 | Flockhart et al. |
| 5,915,012 A | 6/1999 | Miloslavsky |
| 5,926,538 A | 7/1999 | Deryugin et al. |
| 5,926,539 A | 7/1999 | Shtivelman |
| 5,930,786 A | 7/1999 | Carino, Jr. et al. |
| 5,937,051 A | 8/1999 | Hurd et al. |
| 5,937,402 A | 8/1999 | Pandilt |
| 5,940,496 A | 8/1999 | Gisby et al. |
| 5,943,416 A | 8/1999 | Gisby |
| 5,948,065 A | 9/1999 | Eilert et al. |
| 5,953,332 A | 9/1999 | Miloslavsky |
| 5,960,073 A | 9/1999 | Kikinis et al. |
| 5,963,635 A | 10/1999 | Szlam et al. |
| 5,963,911 A | 10/1999 | Walker et al. |
| 5,970,132 A | 10/1999 | Brady |
| 5,974,135 A | 10/1999 | Breneman et al. |
| 5,974,462 A | 10/1999 | Aman et al. |
| 5,982,873 A | 11/1999 | Flockhart et al. |
| 5,987,117 A | 11/1999 | McNeil et al. |
| 5,991,392 A | 11/1999 | Miloslavsky |
| 5,996,013 A | 11/1999 | Delp et al. |
| 5,999,963 A | 12/1999 | Bruno et al. |
| 6,000,832 A | 12/1999 | Franklin et al. |
| 6,011,844 A | 1/2000 | Uppaluru et al. |
| 6,014,647 A | 1/2000 | Nizzari et al. |
| 6,035,332 A | 3/2000 | Ingrassia et al. |
| 6,038,293 A | 3/2000 | Mcnerney et al. |
| 6,044,144 A | 3/2000 | Becker et al. |
| 6,044,205 A | 3/2000 | Reed et al. |
| 6,044,355 A | 3/2000 | Crockett et al. |
| 6,046,762 A | 4/2000 | Sonesh et al. |
| 6,049,547 A | 4/2000 | Fisher et al. |
| 6,052,723 A | 4/2000 | Ginn |
| 6,055,308 A | 4/2000 | Miloslavsky et al. |
| 6,058,424 A | 5/2000 | Dixon et al. |
| 6,058,435 A | 5/2000 | Sassin et al. |
| 6,064,730 A | 5/2000 | Ginsberg |
| 6,064,731 A | 5/2000 | Flockhart et al. |
| 6,084,954 A | 7/2000 | Harless |
| 6,088,441 A | 7/2000 | Flockhart et al. |
| 6,115,462 A | 9/2000 | Servi et al. |
| 6,151,571 A | 11/2000 | Pertrushin |
| 6,154,769 A | 11/2000 | Cherkasova et al. |
| 6,163,607 A | 12/2000 | Bogart et al. |
| 6,173,053 B1 | 1/2001 | Bogart et al. |
| 6,175,564 B1 | 1/2001 | Miloslavsky et al. |
| 6,178,441 B1 | 1/2001 | Elnozahy |
| 6,185,292 B1 | 2/2001 | Miloslavsky |
| 6,192,122 B1 | 2/2001 | Flockhart et al. |
| 6,215,865 B1 | 4/2001 | McCalmont |
| 6,226,377 B1 | 5/2001 | Donaghue, Jr. |
| 6,229,819 B1 | 5/2001 | Darland et al. |
| 6,230,183 B1 | 5/2001 | Yocom et al. |
| 6,233,332 B1 | 5/2001 | Anderson et al. |
| 6,233,333 B1 | 5/2001 | Dezonmo |
| 6,240,417 B1 | 5/2001 | Eastwick |
| 6,259,969 B1 | 7/2001 | Tackett et al. |
| 6,263,359 B1 | 7/2001 | Fong et al. |
| 6,272,544 B1 | 8/2001 | Mullen |
| 6,275,806 B1 | 8/2001 | Pertrushin |
| 6,275,812 B1 | 8/2001 | Haq et al. |
| 6,275,991 B1 | 8/2001 | Erlin |
| 6,278,777 B1 | 8/2001 | Morley |
| 6,292,550 B1 | 9/2001 | Burritt |
| 6,295,353 B1 | 9/2001 | Flockhart et al. |
| 6,345,305 B1 | 2/2002 | Beck et al. |
| 6,353,810 B1 | 3/2002 | Petrushin |
| 6,356,632 B1 | 3/2002 | Foster et al. |
| 6,366,668 B1 | 4/2002 | Borst et al. |
| 6,389,028 B1 | 5/2002 | Bondarenko et al. |
| 6,389,132 B1 | 5/2002 | Price |
| 6,389,400 B1 | 5/2002 | Bushey et al. |
| 6,424,709 B1 | 7/2002 | Doyle et al. |
| 6,426,950 B1 | 7/2002 | Mistry |
| 6,427,137 B2 | 7/2002 | Petrushin |
| 6,430,282 B1 | 8/2002 | Bannister et al. |
| 6,434,230 B1 | 8/2002 | Gabriel |
| 6,449,356 B1 | 9/2002 | Dezonno |
| 6,449,358 B1 | 9/2002 | Anisimov et al. |
| 6,449,646 B1 | 9/2002 | Sikora et al. |
| 6,453,038 B1 | 9/2002 | McFarlane et al. |
| 6,453,346 B1 | 9/2002 | Garg et al. |
| 6,463,148 B1 | 10/2002 | Brady |
| 6,463,346 B1 | 10/2002 | Flockhart et al. |
| 6,463,415 B2 | 10/2002 | St. John |
| 6,480,826 B2 | 11/2002 | Pertrushin |
| 6,490,350 B2 | 12/2002 | McDuff et al. |
| 6,493,695 B1 | 12/2002 | Pickering et al. |
| 6,535,600 B1 | 3/2003 | Fisher et al. |
| 6,535,601 B1 | 3/2003 | Flockhart et al. |
| 6,557,003 B1 | 4/2003 | Powers |
| 6,560,330 B2 | 5/2003 | Gabriel |
| 6,560,649 B1 | 5/2003 | Mullen et al. |
| 6,560,707 B2 | 5/2003 | Curtis et al. |
| 6,563,920 B1 | 5/2003 | Flockhart et al. |
| 6,597,685 B2 | 7/2003 | Miloslavsky et al. |
| 6,614,903 B1 | 9/2003 | Flockhart et al. |
| 6,650,748 B1 | 11/2003 | Edwards et al. |
| 6,671,263 B1 | 12/2003 | Potter et al. |
| 6,691,159 B1 | 2/2004 | Grewal et al. |
| 6,704,409 B1 | 3/2004 | Dilip et al. |
| 6,704,410 B1 | 3/2004 | McFarlane et al. |
| 6,707,903 B2 | 3/2004 | Burok et al. |
| 6,751,669 B1 | 6/2004 | Ahuja et al. |
| 6,754,333 B1 | 6/2004 | Flockhart et al. |
| 6,760,429 B1 | 7/2004 | Hung et al. |
| 6,766,013 B2 | 7/2004 | Flockhart et al. |
| 6,766,014 B2 | 7/2004 | Flockhart et al. |
| 6,865,267 B2 | 3/2005 | Dezonno |
| 6,886,037 B1 | 4/2005 | Brewer et al. |

| | | |
|---|---|---|
| 6,922,466 B1 | 7/2005 | Peterson et al. |
| 6,965,868 B1 | 11/2005 | Bednarek |
| 7,031,449 B1 | 4/2006 | Lundy et al. |
| 7,050,565 B2 | 5/2006 | Sylvain |
| 7,110,525 B1 | 9/2006 | Heller et al. |
| 7,526,079 B2 | 4/2009 | Mello |
| 7,720,737 B2 | 5/2010 | D'Alessandro |
| 2001/0056349 A1 | 12/2001 | St. John |
| 2002/0002460 A1 | 1/2002 | Pertrushin |
| 2002/0002464 A1 | 1/2002 | Pertrushin |
| 2002/0010587 A1 | 1/2002 | Pertrushin |
| 2002/0032591 A1 | 3/2002 | Mahaffy et al. |
| 2002/0118816 A1 | 8/2002 | Flockhart et al. |
| 2002/0181692 A1 | 12/2002 | Flockhart et al. |
| 2002/0194002 A1 | 12/2002 | Petrushin |
| 2003/0123642 A1 | 7/2003 | Alvarado et al. |
| 2003/0152212 A1 | 8/2003 | Burok et al. |
| 2003/0174830 A1 | 9/2003 | Boyer et al. |
| 2003/0177017 A1 | 9/2003 | Boyer et al. |
| 2003/0177231 A1 | 9/2003 | Flockhart et al. |
| 2004/0057569 A1 | 3/2004 | Busey et al. |
| 2004/0203878 A1 | 10/2004 | Thomson |
| 2006/0182252 A1* | 8/2006 | Harris et al. ............. 379/211.01 |
| 2006/0262921 A1* | 11/2006 | Eppel et al. ............. 379/265.02 |
| 2008/0175372 A1 | 7/2008 | Brunet et al. |
| 2009/0187455 A1 | 7/2009 | Fernandes et al. |

FOREIGN PATENT DOCUMENTS

| | | |
|---|---|---|
| CA | 2174762 | 6/1995 |
| EP | 0 501 189 A2 | 9/1992 |
| EP | 0 740 450 A2 | 10/1996 |
| EP | 0 772 335 A2 | 5/1997 |
| EP | 0 855 826 A2 | 7/1998 |
| EP | 0 863 651 A2 | 9/1998 |
| EP | 0829996 A2 | 9/1998 |
| EP | 0866407 A1 | 9/1998 |
| EP | 899673 A2 | 3/1999 |
| EP | 998108 A1 | 5/2000 |
| EP | 1091307 A2 | 4/2001 |
| EP | 1150236 | 10/2001 |
| GB | 2 273 418 | 6/1994 |
| GB | 2 290 192 A | 12/1995 |
| WO | WO 96/07141 | 3/1996 |
| WO | WO 97/28635 | 8/1997 |
| WO | PCT/SE98/01074 | 12/1998 |
| WO | WO 98/56207 | 12/1998 |

OTHER PUBLICATIONS

U.S. Appl. No. 09/247,893, Edwards et al.
U.S. Appl. No. 09/264,497, Edwards.
U.S. Appl. No. 09/756,955, Flockhart et al.
U.S. Appl. No. 09/420,912, Ford.
U.S. Appl. No. 09/416,737, Flockhart et al.
U.S. Appl. No. 10/098,824, Flockhart et al.
U.S. Appl. No. 10/673,118, Flockhart et al.
U.S. Appl. No. 10/673,115, Flockhart et al.
U.S. Appl. No. 10/673,103, Flockhart et al.
U.S. Appl. No. 10/673,105, Flockhart et al.
U.S. Appl. No. 10/683,039, Flockhart et al.
U.S. Appl. No. 10/099,144, Boyer et al.
U.S. Appl. No. 10/815,534, Flockhart et al.
U.S. Appl. No. 10/815,566, Kiefhaber et al.
U.S. Appl. No. 10/815,584, Kiefhaber et al.
U.S. Appl. No. 10/861,193, Flockhart et al.
U.S. Appl. No. 10/891,346, Flockhart et al.
U.S. Appl. No. 10/946,638, Flockhart et al.
U.S. Appl. No. 10/000,686, Flockhart et al.
"Product Features," *Guide to Call Center Automation*, Brock Control Systems, Inc., Activity Managers Series™, Section 5—Company B120, p. 59, 1992.
"Product Features," *Guide to Call Center Automation*, CRC Information Systems, Inc., Tel-Athena, Section 5—Company C520, p. 95, 1992.
Dawson, "NPRI's Powerguide, Software Overview" *Call Center Magazine* (Jun. 1993), p. 85.
"Applications, NPRI's Predictive Dialing Package," *Computer Technology* (Fall 1993), p. 86.
"Call Center Software You Can't Outgrow," *Telemarketing®* (Jul. 1993), p. 105.
"VAST™, Voicelink Application Software for Teleservicing®," *System Manager User's Guide*, Digital Systems (1994), pp. ii, vii-ix, 1-2, 2-41 through 2-77.
GEOTEL Communications Corporation Web site printout entitled "Intelligent CallRouter Call Flow", 1998.
GEOTEL Communications Corporation Web site Printout entitled "The Intelligent CallRouter Product Overview", Jul. 3, 1997.
GEOTEL Communications Corporation Web site printout entitled "Intelligent CallRouter Product Architecture" Jul. 3, 1997.
L.F. Lamel and J.L. Gauvain, Language Identification Using Phone-Based Acoustic Likelihood, ICASSP-94, 4 pages.
John H.L. Hansen and Levent M. Arsian, Foreign Accent Classification Using Source Generator Based Prosodic Features, IEEE Proc. ICASSP, vol. 1, pp. 836-839, Detroit USA (May 1995).
Levent M. Arsian and John H.L. Hansen, Language Accent Classification in American English, Robust Speech Processing Laboratory, Duke University Department of Electrical Engineering, Durham, NC, Technical Report RSPL-96-7, revised Jan. 29, 1996. pp. 1-16.
Levent M. Arsian, Foreign Accent Classification in American English, Department of Electrical Computer Engineering, Duke University, Thesis, pp. 1-200 (1996).
E. Noth et al., "Research Issues for the Next Generation Spoken": University of Erlangen-Nuremberg, Bavarian Research Centre for Knowledge-Based Systems, at http://www5.informatik.uni-erlangen.de/literature/psdir/1999/Noeth99:RIF.ps.gz 16 pages.
Presentation by Victor Zue, The MIT Ox90ygen Project, MIT Laboratory for Computer Science (Apr. 25-26, 2000) 9 pages.
MIT Project Oxygen, Pervasive, Human-Centered Computing (MIT Laboratory for Computer Science) (Jun. 2000) pp. 1-15.
Examiner's Refusal Decision dated Jul. 4, 2005 in Japanese Patent App. No. 2000-34266.
Examiner's Refusal Decision for Japanese Patent Application No. 2000-34267 dated Mar. 9, 2005 with translation, 4 pages.
Avaya, Inc. Business Advocate Product Summary, at http://www.avaya.com, downloaded on Feb. 15, 2003, Avaya, Inc. 2003, 3 pages.
Avaya, Inc. Business Advocate Options, at http://www.avaya.com, downloaded on Feb, 15, 2003, Avaya, Inc. 2003.
Avaya, Inc. CentreVu Advocate, Release 9, User Guide, Dec. 2000.
"Internet Protocol Addressing," available at http://samspade.org/d/ipdns.html, downloaded Mar. 31, 2003, 4 pages.
"Domain Name Services," available at http://www.pism.com/chapt09/chapt09.html, downloaded Mar. 31, 2003, 21 pages.
Bellsouth Corp., "Frequently Asked Questions—What is a registrar?," available at https://registration.bellsouth.net/NASApp/DNSWebUI/FAQ.jsp, downloaded Mar. 31, 2003, 4 pages.
Ahmed, Sarah, "A Scalable Byzantine Fault Tolerant Secure Domain Name System," thesis submitted to Massachusetts Institute of Technology, Department of Electrical Engineering and Computer Science, Jan. 22, 2001, 101 pages.
Coles, Scott, "A Guide for Ensuring Service Quality in IP Voice Networks," Avaya, Inc., 2002, pp. 1-17.
Avaya, Inc., "The Advantages of Load Balancing in the Multi-Call Center Enterprise," Avaya, Inc., 2002, 14 pages.
Foster, Robin, et al., "Avaya Business Advocate and its Relationship to Multi-Site Load Balancing Applications," Avaya, Inc., Mar. 2002, 14 pages.
Chavez, David, et al., "Avaya MultiVantage Software: Adapting Proven Call Processing for the Transition to Converged IP Networks," Avaya, Inc., Aug. 2002.
Avaya, Inc., "Voice Over IP Via Virtual Private Networks: An Overview," Avaya, Inc., Feb. 2001, 9 pages.
Avaya, Inc., "Better Implementation of IP in Large Networks," Avaya, Inc. 2002, 14 pages.
*CentreVu Advocate Release 9 User Guide*, Avaya Inc., 585-215-953, Issue 1 (Dec. 2000), pp. 1-210.
"The Advantages of Load Balancing in the Multi-Call Center Enterprise," Avaya Inc. White Paper (Feb. 2002), pp. 1-13.
"Voice Over IP Via Virtual Private Networks: An Overview," Avaya Inc. White Paper (Feb. 2001), pp. 1-8.

"Better Implementation of IP in Large Networks," Avaya Inc. Application Note (Apr. 19, 2002), pp. 1-14.

"Internet Protocol Addressing," available at http://samspade.org/d/ipdns.html, downloaded Mar. 31, 2003, 9 pages.

David Chavez et al., "Avaya MultiVantage Software: Adapting Proven Call Processing for the Transition to Converged IP Networks," Avaya Inc. White Paper (Aug. 2002), pp. 1-18.

Doo-Hyun Kim et al. "Collaborative Multimedia Middleware Architecture and Advanced Internet Call Center," Proceedings at the International Conference on Information Networking (Jan. 31, 2001), pp. 246-250.

"When Talk Isn't Cheap, " *Sm@rt Reseller*, v. 3, n. 13 (Apr. 3, 2000), p. 50.

"eGain's Commerce 2000 Platform Sets New Standard for eCommerce Customer Communications," *Business Wire* (Nov. 15, 1999)., 3 pages.

Douglas W. Stevenson et al., "Name Resolution in Network and Systems Management Environments," available at http://netman.cit.buffalo.edu/Doc/DStevenson/NR-NMSE.html, downloaded Mar. 31, 2003, 16 pages.

U.S. Appl. No. 11/243,436, filed Oct. 3, 2005, Kalavar.

U.S. Appl. No. 11/243,437, filed Oct. 3, 2005, Hunter et al.

U.S. Appl. No. 11/344,733, filed Jan. 31, 2006, Kalavar.

GEOTEL Communications Corporation Web site printout entitled "Intelligent CallRouter" Optimizing the Interaction Between Customers and Answering Resources. 6 pages, 1998.

* cited by examiner

AGENT DRIVEN WORK ITEM AWARENESS FOR TUNING ROUTING ENGINE WORK-ASSIGNMENT ALGORITHMS

CROSS REFERENCE TO RELATED APPLICATION

Cross reference is made to U.S. patent application Ser. No. 11/243,436, not yet assigned, filed Oct. 3, 2005, entitled "Work Item Relation Awareness for Agents During Routing Engine Driven Sub-Optimal Work", which is incorporated herein by this reference. Cross reference is also made to U.S. patent application Ser. No. 11/243,437, not yet assigned, filed Oct. 3, 2005, entitled "Agent Driven Media Agnostic Work Item Grouping and Sharing Over a Consult Medium", which is also incorporated herein by this reference.

FIELD

The invention relates generally to servicing interactions in a contact center and specifically to enhancing the efficiency with which interactions and contacts are handled.

BACKGROUND

Contact centers, such as Automatic Call Distribution or ACD systems, are employed by many enterprises to service customer contacts and non-media interactions or activities (i.e., one or more elements within a business process). Media and non-media interactions are collectively referred to as "work items". A typical contact center includes a switch and/or server to receive and route incoming packet-switched and/or circuit-switched interactions and one or more resources, such as human agents and automated resources (e.g., Interactive Voice Response (IVR) units), to service the incoming interactions.

A workflow routing engine directs work items to various agents based on algorithms and predetermined criteria. Conventionally, the ACD's controller identifies all predefined interaction-handling skills of the agent and delivers to the agent the interaction that best matches the agent's highest-priority skill. The criteria may be customer-specifiable (i.e., programmable by the contact center operator) via a call vectoring capability or through complex programmable workflows that select the "optimal" agent based on various parameters. Normally predetermined criteria include agent skills, interaction requirements, media type and availability of an agent, expected contact wait time, etc.

In multi-media contact centers servicing a wide variety of contact types, different routing and queuing algorithms are commonly used for different media types to increase the accuracy and speed with which such contacts are handled. Unlike voice calls, when a document-based contact (e.g., email, fax, Short Message Service or SMS message, instant message, etc.) is received, the contact's text may be analyzed via natural language processing to determine the topic and then routed to an "optimal" agent (e.g., Subject Matter Expert or SME) for that topic. A voice call, in contrast, is analyzed by the time intensive interaction of an automated resource, specifically an IVR, with the customer. When a customer sends in an email with a question to a contact center, they are not always concerned with receiving immediate feedback. In contrast, when a customer calls into a contact center with a question they almost certainly do not want to wait for days to be attended to. As a consequence, the rules regarding how these two different media types are handled vary significantly. When a call comes into a call center, the amount of time a call has waited is often the most important parameter that determines where that contact is sent. However, when an email comes into a contact center, matching of agent skills with contact requirements is commonly the most important parameter, and the amount of time that contact sits in the queue is not as high a priority.

Exemplary multi-media contact center work item routing parameters include routing an interaction escalated by a customer (e.g., email) to an agent who has handled a previous escalated interaction from the same customer, but over different media (e.g., voice); routing an interaction (e.g., a first email from a first customer) to an agent who has previously handled an interaction that is part of the same thread (e.g., the first email is a reply to a second email sent by a first agent, which in turn was a response to a third email that was the first customer's initial email into the contact center); and routing an interaction based on the available agent's skill sets. As used herein, "escalation" is the process of generating an incoming interaction.

Commonly, the only conditions that result in an interaction not being delivered to an agent are first that there are not available agents for that escalated media type (in which case the interaction is queued indefinitely to be routed to the next available agent) and second that there are no interactions in the contact center to be delivered.

There are many occasions when the workflow routing engine chooses an agent who cannot handle a given interaction or set of interactions, usually because the workflow routing engine is making decisions with a limited amount of information (the relatively-easy-to-determine parameters). When this situation arises, the agent is typically required to put the interaction back into the queue, and the workflow routing engine is forced to re-route the contact or find another agent who may or may not be able to handle the given interaction. Every time an interaction is re-routed from agent to agent, precious bandwidth and contact center capacity is utilized, plus the customer has to wait that much longer to have their interaction serviced. It is also not uncommon to have a single interaction be re-routed multiple times in a typical contact center. These unfortunate delays pose a serious inconvenience to any customer who has escalated an interaction, especially a customer who has escalated a real time interaction.

In current call centers, every time the workflow routing engine chooses a new agent for a re-routed interaction, it does so using only the information it received from the initial IVR or human agent exchange. The only thing that the workflow routing engine knows during a re-route is that it should not send that particular interaction back to the same agent. This negative limitation is the only information the workflow routing engine gains during a re-route. The workflow routing engine can only make a routing decision as "smart" as the information it has available to it. This information typically does not change once an interaction or set of interactions has been assigned to a first servicing agent, thus re-routes and transfers are completed with basically the same information that was available to the workflow routing engine during the first assignment. For this reason, during re-routes and transfers, the workflow routing engine will sometimes assign agents to an interaction(s) who are incapable of servicing that given interaction(s).

In addition, when a second interaction enters the contact center that is similar to the previously re-routed interaction, that interaction sometimes finds itself being assigned by the workflow routing engine to the same agent who has already determined that he cannot handle this type of interaction. The agent is then forced to spend time rerouting interactions of the same type back to the workflow routing engine for additional re-routes. All the while, the customer must wait for an exceptional amount of time until they are finally routed to an agent that can handle their queries. All of these potentially unnecessary re-routes can lead to unhappy customers and frustrated agents.

The following examples illustrate the above-noted contact center inefficiencies. In a first example a customer has escalated a chat to query about an email that they had sent sometime earlier. The customer record in the contact center specifies the chat customer's email id to be customer@address1.com, while the email sent earlier was from another account, customer@address2.com. Since the address2.com account is not part of the customer record, the contact center routing algorithms have no way to detect that this chat escalation is related to the previous email. It may happen that these interactions initially arrive at the same agent's desktop. However, the agent is not a domain expert on the topic associated with the chat and email, so the agent would like to transfer the chat interaction back to another chat queue and would also like to transfer the email interactions back to another email queue. In this scenario, the agent knows that these interactions are related (from the same customer) based on conversations with the customer. Unfortunately, the contact center routing engine has no idea of this relation. If the agent transfers both these interactions, the workflow routing engine may make the mistake of sending the interactions to two different agents. This will lead to a duplication of work in the contact center and result in decreased contact center efficiency.

As another example, an agent has multiple interactions assigned to him/her. In this scenario, assume the interactions include 20 emails and 10 fax interactions. All interactions are from different customers, but some of them have a common topic—that of a home loan application. The agent is a domain expert on car loans, but not home loans. The agent decides to transfer all these home loan application related emails back to the system. Now, the routing engine may not know they are related in intent or purpose, since they are not from the same customer. In this case, the emails may get routed to different agents, when ideally, they should go to just one agent, since they are related, and therefore the agent could deal with all of them quickly and efficiently.

The foregoing examples reveal a number of problems in conventional contact centers. Every contact center confronts situations where the workflow routing engine initially fails to direct the interactions to a capable agent. Transfers and re-routes are common place in all contact centers and every uninformed re-route by the workflow routing engine leads to increased inefficiencies of the contact center as a whole. Workflow routing engines are only as smart as the information they have available to them. They have no way to collect information for an interaction without some other entity providing it to them. Some contact centers have IVR's and other initial information gathering members that can provide fairly easy to acquire information to the contact center. However, these members are limited in that they are only able to gather information for one interaction at a time and can only do so when an interaction enters a contact center. Furthermore, none of the current information collecting members are able to continually update information pertinent to a given interaction during that interaction's existence in the contact center. There is no mechanism available to allow the human agents of a contact center to provide additional "human" intelligence to the workflow routing engine before or during a re-route/transfer.

SUMMARY

The present invention is directed generally to agent assistance of a workflow routing engine during a re-route of an interaction or set of interactions.

In one embodiment, the agent "assists" the routing engine by providing the routing engine with a "deductive context" regarding a work item or set of work items that is known to the agent but was unknown to the routing engine when the work item or set of work items was initially routed. The deductive context can include any information that would have been relevant to the routing engine's routing decision. Examples of deductive context include the currently assigned work item's relationship to other active (i.e., awaiting service or being serviced) or inactive (i.e., previously serviced) work items from the same customer currently existing in the contact center. In particular, re-routed, related work items, though initially delivered to the contact center over different media channels and/or types, can be "bundled" or combined and assigned by re-routing to a common agent. Commonly, work item(s) are related when they have a common source or point of origin (e.g., customer), topic or subject matter, same intent, or as a result of contact center-specified business rules.

In one configuration, the deductive context is provided using relationship pointers in a data structure associated with the assigned work item. The pointers point to related work items that should be bundled together with the assigned work item and re-routed as a group of work items to a common agent. The pointers may have attributes that, in turn, provide the routing engine with additional information relevant to the re-route request, such as the type of relationship between/among the identified work items (e.g., "same intent", "same customer", etc.). The pointers and attributes collectively provide the deductive context to the routing engine in a format that the routing engine is already configured to process.

Providing the routing engine with an agent-provided deductive context can ensure that, when the work item is requeued and/or re-routed through a transfer by the agent, the routing engine can use the deductive context to understand the relationship(s) (of which the engine was previously unaware) between the work item(s) to be transferred and other work item(s), can use the deductive context in selecting an optimal resource (whether human or automated) for the work item(s), and can assign the work item(s), most likely as a group, to a common agent. Unlike the prior art, the invention uses, rather than ignores, human intelligence in the work item routing process. Such information permits the engine to understand relationships between/among work items that are far from obvious. The invention effectively allows the routing engine to use agent-driven assistance for improved routing decisions based on parameters deduced by the initially assigned human agent.

The invention can enable routing engines to make better or more optimal routing decisions using agent-driven deductive context. Although routing engine logic is relatively sophisticated and efficient, it nonetheless can fail, due to unawareness of relevant routing parameters, to initially make the most effective, or optimal, work item assignment. Thus, the invention can provide, relative to existing contact centers, substantial improvements in contact center efficiency, reduced work item waiting and service times, higher levels of work item service, and increased levels of customer satisfaction.

The invention can be readily implemented in current contact center designs. Current contact centers permit agents to transfer work items back to the routing engine. Contact centers support such transfer and conference functions because an agent may not be able to handle a particular work item, even though the routing engine already determined that the routing was optimal. Common reasons for the agent being unable to service the contact include agent load, agent breaks, agent is not skilled to handle this contact, or the agent refuses the contact. The routing engine logic therefore is readily adaptable to consider deductive context when a re-route request is received from an agent who could not handle the contact or set of contacts.

A number of definitions are used herein.

"Interactions" refers to an atomic unit of work arriving into a contact center that may be delivered over a particular media channel or through implementation of a specific business process. These interactions may or may not be serviced using a particular media server. An example of a media specific interaction would be an email sent by a customer, a chat session, a phone call, a fax document, voice-over-IP or VoIP call, video call, etc. An example of a non-media interaction would be any element within a processing flow that has a representation within the contact center, such as a loan form filling operation, actions an agent needs to take to place a customer order, and so on. The term "interaction" will be used to represent media specific work items as well as non-media interactions and activities.

A "contact" refers to a 'physical' grouping of one or more atomic interactions or activities that defines a "context".

An "activity" refers to non-media business process representations that are treated as atomic work items within the contact center space. It is expected that these "activities" in the process flow will have a representation within the contact center domain.

"Context" defines the media agnostic logical grouping of atomic work items (e.g., interactions, activities, etc.). In contrast, a "contact" is the physical representation of the "context". For example, a "context" can be based on predefined rules that identify a relation between the interactions that constitute the grouping prior to the interaction being assigned to an agent, where the relation is defined by the work item routing engine and/or agent initiated grouping (where the agent determines that some work items are related and need to be grouped). An example of rules would be 'same originating customer', 'same email thread', 'same fax thread', 'same topic determination' (where the originating customer or media over which the interaction is delivered is different, but the topic is the same), 'same application form to be filed', etc.

A "thread" refers to a series of contacts involving a common party and common subject matter. Alternatively, the "context" may be an agent initiated grouping, where the agent determines that some interactions are related, and need to be grouped.

"At least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

These and other advantages will be apparent from the disclosure of the invention(s) contained herein. The above-described embodiments and configurations are neither complete nor exhaustive. As will be appreciated, other embodiments of the invention are possible using, alone or in combination, one or more of the features set forth above or described in detail below.

DETAILED DESCRIPTION

The invention will be illustrated below in conjunction with an exemplary communication system. Although well suited for use with, e.g., a system having an ACD or other similar contact processing switch, the invention is not limited to use with any particular type of communication system switch or configuration of system elements. Those skilled in the art will recognize that the disclosed techniques may be used in any communication application in which it is desirable to provide workflow routing assistance from a contact center agent.

Figure 1:
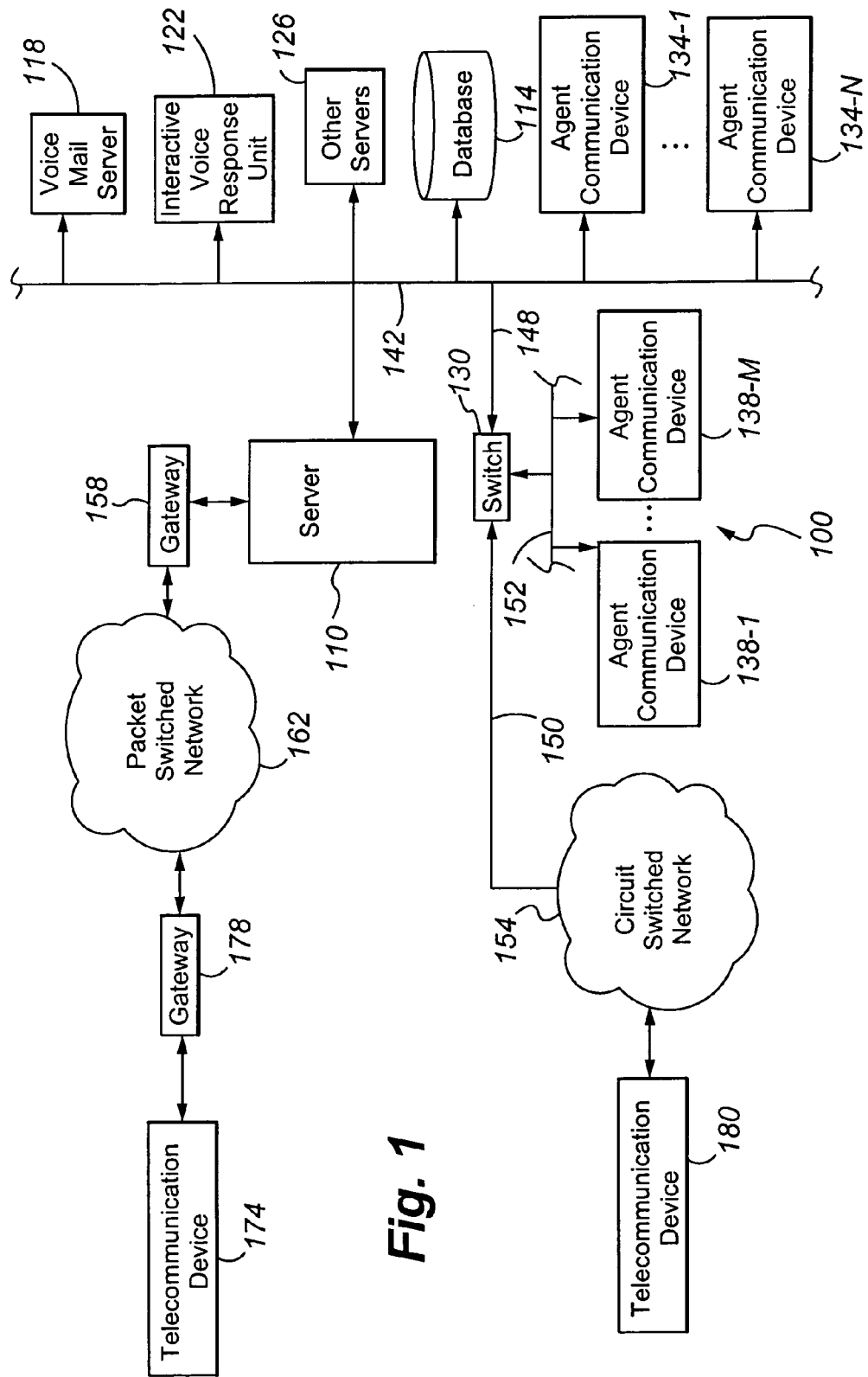
FIG. 1 is a block diagram depicting a contact center in accordance with an embodiment of the present invention.

FIG. 1 shows an illustrative embodiment of the present invention. A contact center 100 comprises a central server 110, a set of data stores or databases 114 containing contact or customer related information and other information that can enhance the value and efficiency of the contact, and a plurality of servers, namely a voice mail server 118, an Interactive Voice Response unit or IVR 122, and other servers 126, a switch 130, a plurality of working agents (not shown) operating packet-switched (first) telecommunication devices 134-1 to N (such as computer work stations or personal computers), and/or circuit-switched (second) telecommunication devices 138-1 to M, all interconnected by a local area network LAN (or wide area network WAN) 142. The servers can be connected via optional communication lines 148 to the switch 130. As will be appreciated, the other servers 126 can also include a scanner (which is normally not connected to the switch 130 or Web server), VoIP software, video contact software, voice messaging software, an IP voice server, a fax server, a web server, SMTP and POP3 servers for relaying and receiving emails respectively, chat server to host chat sessions, instant messaging gateways, SMS/MMS gateways for receiving SMS/MMS messages through a mobile device, context analysis appliances, auto-responders, VOID gateways, and the like. The switch 130 is connected via a plurality of trunks 150 to the Public Switch Telecommunication Network or PSTN 154 and via link(s) 152 to the second telecommunication devices 138-1 to M. A gateway 158 is positioned between the server 110 and the packet-switched network 162 to process communications passing between the server 110 and the network 162.

The term "switch" or "server" as used herein should be understood to include a PBX, an ACD, an enterprise switch, an enterprise server, or other type of telecommunications system switch or server, as well as other types of processor-based communication control devices such as media servers, computers, adjuncts, etc.

Referring to FIG. 1, the gateway 158 can be any suitable gateway device, such as Avaya Inc.'s, G700™, G600™, MCC/SCC™ media gateways and may be implemented as hardware such as via an adjunct processor (as shown) or as a chip in the server.

The first telecommunication devices 134-1 . . . 134-N are packet-switched and can include, for example, IP hardphones such as the Avaya Inc.'s 4600 Series IP Phones™, IP softphones such as Avaya Inc.'s IP Softphone™, Personal Digital Assistants or PDAs, Personal Computers or PCs, laptops, packet-based H.320 video phones and conferencing units, packet-based voice messaging and response units, and packet-based traditional computer telephony adjuncts.

The second telecommunication devices 138-1 . . . 138-M are circuit-switched. Each of the telecommunication devices 138-1 . . . 138-M corresponds to one of a set of internal extensions. The switch/server can direct incoming contacts to and receive outgoing contacts from these extensions in a conventional manner. The second telecommunication devices can include, for example, wired and wireless telephones, PDAs, H.320 video phones and conferencing units, voice messaging and response units, and traditional computer telephony adjuncts.

It should be noted that the invention does not require any particular type of information transport medium between switch or server and first and second telecommunication devices, i.e., the invention may be implemented with any desired type of transport medium as well as combinations of different types of transport media.

The packet-switched network 162 can be any data and/or distributed processing network, such as the Internet. The network 162 typically includes proxies (not shown), registrars (not shown), and routers (not shown) for managing packet flows.

The packet-switched network 162 is in communication with an external first telecommunication device 174 via a gateway 178, and the circuit-switched network 154 with an external second telecommunication device 180. These telecommunication devices are referred to as "external" in that they are not directly supported as telecommunication device endpoints by the switch or server. The telecommunication devices 174 and 180 are an example of devices more generally referred to herein as "external endpoints."

In a preferred configuration, the server 110, network 162, and first telecommunication devices 134 are Session Initiation Protocol or SIP compatible and can include interfaces for various other protocols such as the Lightweight Directory Access Protocol or LDAP, H.248, H.323, Simple Mail Transfer Protocol or SMTP, IMAP4, ISDN, E1/T1, and analog line or trunk.

It should be emphasized that the configuration of the switch, server, user telecommunication devices, and other elements as shown in FIG. 1 is for purposes of illustration only and should not be construed as limiting the invention to any particular arrangement of elements.

Figure 2:
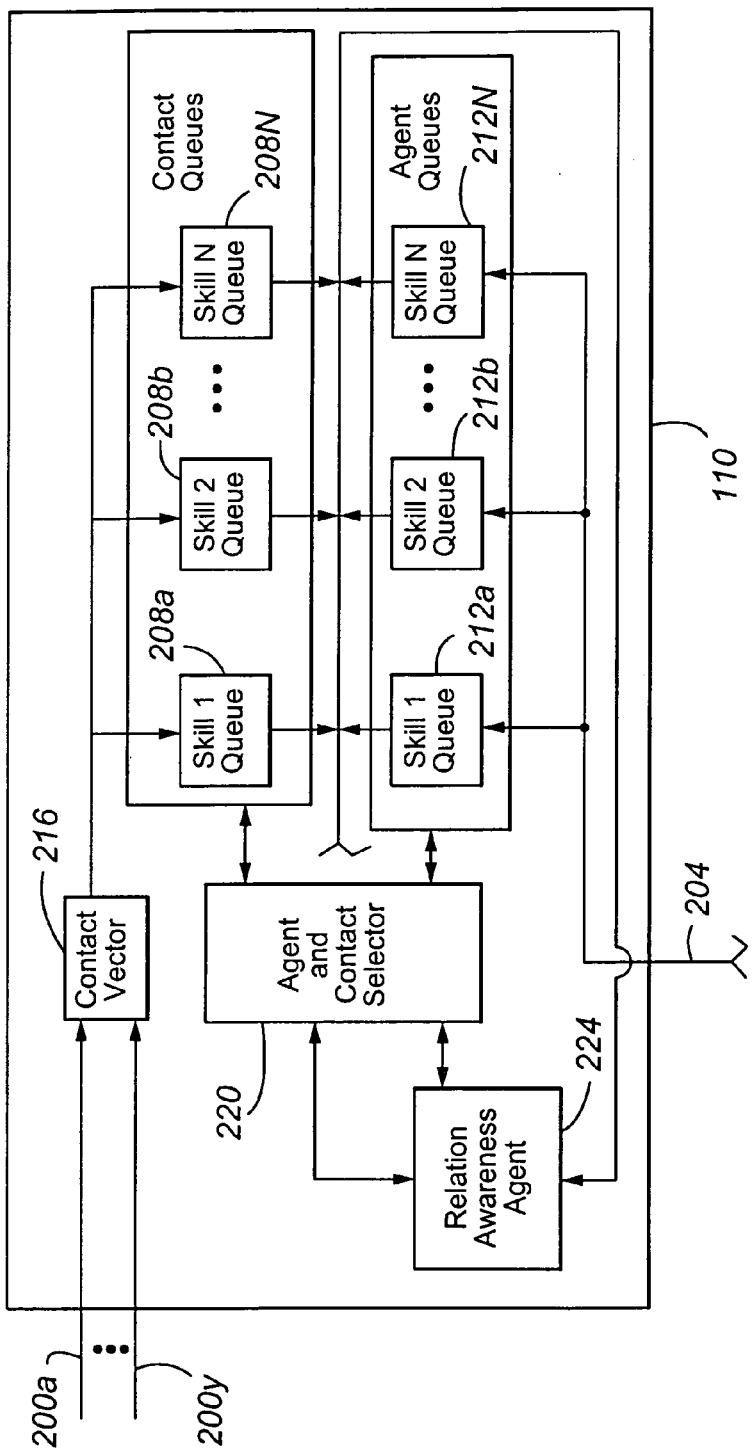
FIG. 2 is a block diagram depicting a server in accordance with another embodiment of the present invention.

Referring to FIG. 2, one possible configuration of the server 110 is depicted. The server 110 is in communication with a plurality of customer communication lines 200a-y (which can be one or more trunks, phone lines, etc.) and agent communication line 204 (which can be a voice-and-data transmission line such as LAN 142 and/or a circuit switched voice line 140). The server 110 can include an agent and contact selector 220 and a relation awareness agent 224, whereby the relation awareness agent 224 provides agents in a contact center a modality to provide the agent and contact selector 220 with new information about a given interaction or set of interactions during a re-route/transfer. The agent and contact selector 220 was not aware of the new information before the re-route/transfer.

Also included among the data stored in the server 110 are a set of interaction queues 208a-n and a separate set of agent queues 212a-n. Each interaction queue 208a-n corresponds to a different set of agent skills, as does each agent queue 212a-n. Conventionally, interactions are prioritized and either are enqueued in individual ones of the interactions queues 208a-n in their order of priority or are enqueued in different ones of a plurality of interaction queues that correspond to a different priority. Interactions in a common queue need not be of the same media type. For example, one interaction queue could contain VoIP calls, telephone calls, emails, and chats. Furthermore, a single interaction could be a physical representation of a grouping of different media types, e.g., one interaction may be a grouping of emails and calls from a similar customer or even from different customers related to the same subject matter. Likewise, each agent's skills are prioritized according to his or her level of expertise in that skill, and either agents are enqueued in individual one of agent queues 212a-n in their order of expertise level or are enqueued in different ones of a plurality of agent queues 212a-n that correspond to a skill and each one of which corresponds to a different expertise level. Included among the control programs in the server 110 is a contact vector 216. Interactions incoming to the contact center are assigned by contact vector 216 to different interaction queues 208a-n based upon a number of predetermined criteria, including customer identity, customer needs, contact center needs, current contact center queue lengths, interaction media type, customer value, and the agent skill that is required for the proper handling of the interaction. Agents who are available for handling interactions are assigned to agent queues 212a-n based upon the skills that they possess. An agent may have multiple skills, and hence may be assigned to multiple agent queues 212a-n simultaneously. Furthermore, an agent may have different levels of skill expertise (e.g., skill levels 1-N in one configuration or merely primary skills and secondary skills in another configuration), and hence may be assigned to different agent queues 212a-n at different expertise levels. Additionally, agents can be non-human interaction handling media. For instance, a recording device may be the "agent" that an interaction is directed to as an intermediate step to assigning a human agent to processing the interaction. The definition of agent need not be limited to human servicing agents.

The relation awareness agent 224 provides a mechanism for any agent in the agent queues 212a-n to supply the agent and contact selector 220 with new or non-obvious (previously unknown) information, or deductive context, pertaining to a work item or set of work items upon a transfer or re-route of one or more of the work items. This non-obvious information is information that was previously unavailable to the agent and contact selector 220 when one or more of the work items was initially routed to a queue and/or agent. Examples of non-obvious information include information that was received by an agent during an exchange with a customer, information regarding related work items, the intent of the work item (if content analysis is not enabled), or any other type of information that was not obtained by an IVR, initial information collection agent, and prior interactions with the customer, or is otherwise unavailable to the routing engine when the work item was routed.

The deductive context and other information can be provided to the selector by a data structure that is created for each work item in the contact center (regardless of the media or process implementation over or by which the work item arrives) and used by the routing engine in determining where to route the work item. The data structure is preferably a media agnostic/process agnostic representation, possibly via a map or an equivalent thereof, that stores relationship pointers, such as a pointer to a corresponding work item, and work item attributes, such as a unique work-item/interaction identifier, the current state/status of the work-item, a customer record or pointer thereto, media specific parameters such as ANI or DNIS digit collection and analysis for a telephony call, originating email address, chat session user id, computer IP address, SIP identifier, voice recognition results, email headers for an email, media type indicator, etc.

The data structure preferably represents the media agnostic view of the work item, where the media type is just another attribute in the map, assuming that there is a media type for the work item. This data structure will be referred to as the Electronic Data Unit or "EDU" as used hereinafter, and the unique identifier of the EDU as the "EDUID". Attributes within the data-structure provide a complete view of an incoming interaction. The EDU represents how the information flows within the contact center system throughout the life cycle of an interaction. The EDU may also contain information relating to the last interaction that was initiated by the same person to assist the agent in handling this particular interaction more effectively. As long as the EDU is available, services within the contact center that have access to this EDU at a given point in time can use the EDUID to access the work item attributes within the EDU. Attributes within the EDU may be added, changed, or removed by the server 110 and/or any agent in the contact center.

In one configuration, the EDU is a container of attributes. By judicious use of attribute identifiers, one can define sub-containers within the EDU that contain attributes associated with a particular function. For example, the attribute "media" could be a simple accessor for the work item's media type. There could be sub-containers within any given attribute, for instance "email.header" would have "email" as the container within the EDU, and "email.header" would be a sub-container within the "email" container. The true attribute identifier may exist in any one of these containers or sub-containers and they would allow the agents and server to access the information of any given contact. As a continuation of the above example, the true attribute identifier for the email's content type may be in the sub-container "email.header.contenttype". While this type of container based (nested) functional grouping of attributes is not necessary, it allows for a logical categorization of attributes, which can be useful. The term "container" refers to one or more logical categorizations in the EDU. Another type of "container" is a related interaction or grouping container.

The determination of whether interactions are related is done by the agent after assignment of the work item to the agent, commonly during servicing of the work item, and prior to or at the time of transferring the work item(s) back to the routing engine. Once the agent realizes that some interactions he wishes to transfer or re-route are related in some way, he can group the related interactions to generate the deductive context using the mechanism described below. Achieving this awareness context includes invoking the relation awareness agent 224 to create relationship pointers between the related interactions, thereby providing the agent and contact selector 220 with knowledge that the interaction to be re-routed is related to some other interaction. This is done so that the agent and contact selector 220 can consider the additional information when making the transfer or re-route. In the simplest case, the pointer may be a reference to the EDUID(s) of one or more other work items that the re-routed work item is related to and which is/are currently assigned to other agents or still enqueued.

Relationship pointers may also have attributes that describe to the agent and contact selector 220 the exact relationship of given interactions and provide other relevant information. For example, the attributes may include a suboptimal routing indicator (which is a flag that is set/unset depending on whether the routing decision was optimal (correct) or suboptimal (incorrect)), an optimal agent identifier indicating, for suboptimal routes, the optimal agent that should have been selected for the subject contact/customer, and an optimal agent selection code(s) setting forth, for suboptimal routes, the reason(s) why the optimal agent should be selected. By including the suboptimal routing information in the EDU associated with the selected contact, the relation awareness agent 224 notifies the routing engine that a suboptimal routing decision has been made and why.

The relationship pointers and their attributes (if any) are then stored and passed to the agent and contact selector 220 when the work item(s) are re-queued/transferred. As mentioned earlier, the EDU exists for the lifecycle of the interaction and, using the EDUID, is accessible by components within the contact center system. Thus, one can rely on this data structure to maintain the generated relationships for the lifetime of an interaction. The EDU is accordingly used to store the generated "deductive context" relationships.

The EDUs may be of one of two basic configurations. In a simple case, the EDU container can reside in the existing EDUs associated with the "n" interactions that have been grouped. The container can be transitory and created for the duration of the agent session (agent who owns these grouped interactions) or it can be persistent and remain until "n−1" interactions in the grouping have been completed. The EDU container may stay around in a particular EDU until ownership of the interaction associated with the EDU has been transferred to another agent, as a result of a re-route/transfer. To track these over a period of multiple re-routes, one could also have new EDU containers defined for each successive re-route, without having the need to overwrite old ones. This can give a historical perspective on the number of times re-routes occurred, the interactions involved, and the like.

In a complex case, the EDU container may not be a container within the existing EDU's associated with the group, but rather a new EDU may itself contain the EDUs of the grouped contacts. This configuration may be useful in treating the grouping as one for the duration of all interactions. For purposes of the present invention, it does not matter whether the EDU container is persisted or not and whether the EDU container is written into existing EDUs or in a newly created EDU to implement the solution.

In a preferred implementation, pointers are created in the EDUs of each of the work items, including the assigned work item and the related work items. For example, assume that a first work item is routed to a first agent, a second work item has been routed to a second agent, and a third work item has been routed to a third agent. Each of the first, second, and third work items are currently active in the contact center. Further assume that first, second, and third EDUs correspond respectively to the first, second, and third work items and that the three work items are related to one another because they involve the same customer and/or similar or the same subject matter, even though the various work items may be on different channels of the same media type or over different media types. For example, an email and voice contact currently enqueued for the same customer are "related". Likewise, two currently enqueued voice contacts directed to the same technical question are "related". Furthermore, the work items can be determined to be "related" by a human agent for any other reason that may help in the re-routing/transfer and subsequent servicing of the given work item(s). The first agent determines that the three contacts are related. He therefore requests re-routing of the three contacts to a common agent. Relationship or awareness pointers are generated in each EDU with respect to the other work items. Thus, pointers to the first and second work items are included in the third work item's EDU, to the first and third work items in the second work item's EDU, and to the second and third work items in the first work item's EDU. The pointers are the EDUIDs of the other related work items' EDUs. The pointers' attributes may also provide the agent and contact selector 220 with other contextual information (e.g., why the work items are related, queue position information, interaction assignment information, etc.) about the other work items. The pointers and associated attributes are then stored and passed to the routing engine when the work item(s) are re-routed/transferred. When the routing engine receives the request to re-route the first work item, it extracts the pointers/attributes and knows the identities of the second and third work items and the reason(s) for the request. It may then re-route the work items appropriately, such as by routing the work items to a common agent.

A further example illustrates how a human agent can use the EDU container to generate the deductive context for the agent and contact selector 220 by using the relation awareness agent 224. The human agent determines that a voice call (EDUID du_voice_1) is related to an email (EDUID du_email_1), both of which are assigned to him but he cannot handle, and wants to generate relationship pointers so the agent and contact selector 220 can know of this. To generate the relationship pointer graph, a container is created in the each interaction's EDU called "assist". Entries within this container will contain the generated context specific data. "assist.interaction.*" Sub-containers are then built that provide a reference to all the related interactions that are part of this deductive context (as determined by the agent). An entry "assist.relation" will indicate the actual relationship as seen by the agent (or the reason for the re-route request). For example, the "assist.relation" could be "same-customer", "same-intent", etc. The set of possible agent specified relations is also available to the agent and contact selector 220.

After the relationship context is determined, the following entries may be generated within a newly created EDU container and/or within the EDUs of all the interactions that are part of the deductive context and that need to be transferred.
EDU for Voice (EDUID-du_voice_1):
assist.interaction.1.id=du_email_1 [relationship pointer]
assist.relation=same intent
EDU for Email (EDUID-du_email_1):
assist.interaction.1.id=du_voice_1 [relationship pointer]
assist.relation=same intent As explained above, an assist deductive context container has been created in the grouped interactions that reflect the relations built. When this interaction is re-routed/transferred, the agent and contact selector 220 gets notification that it needs to re-run routing algorithms on this re-routed/transferred interaction. At this point, it has access to the transferred interaction's EDU, and thus access to the deductive context container "assist.interaction.", and the "assist.relation" and therefore all the necessary contextual data needed to make the correct routing decisions using the agent specified relationship context.

In one configuration, the agent and contact selector 220 extracts this relationship information and uses it to determine that the related interactions need to be treated as potentially one unit, and should get assigned to the same agent if possible. This decision could never have been made had the human agent not provided the relationship context to the agent and contact selector 220.

In another configuration, the agent and contact selector 220 may re-route/transfer the given interactions to multiple queues, distributing them among commonly qualified servicing agents. When one interaction in the related set of interactions is assigned to a servicing agent, the relational pointers in the EDU notify the servicing agent that other interactions exist in the contact center that are related to the instant interaction. The servicing agent can use this information accordingly to have all interactions serviced in the most efficient manner. For example, the next assigned agent can have the other interactions transferred to him/her only after it is determined that he/she can service that type of interaction, or could simply service the one interaction and create new fields in the EDU, and pointers to the related interactions notifying others that he/she is currently servicing a related interaction. If the next assigned agent cannot handle this particular type of interaction then he/she could re-route/transfer the one interaction and the other related interactions would not need to concede their place in their respective queues.

In an alternative configuration, when the interaction is assigned to the servicing agent, all other related interactions can be instantly pulled from their respective queues and assigned to the same servicing agent. This particular configuration (which works well for multiple contacts from a common source) treats all interactions separately until one is assigned to a servicing agent, at that point the relationship pointers are used to pull all other interactions together to be treated as one interaction.

Figure 3:
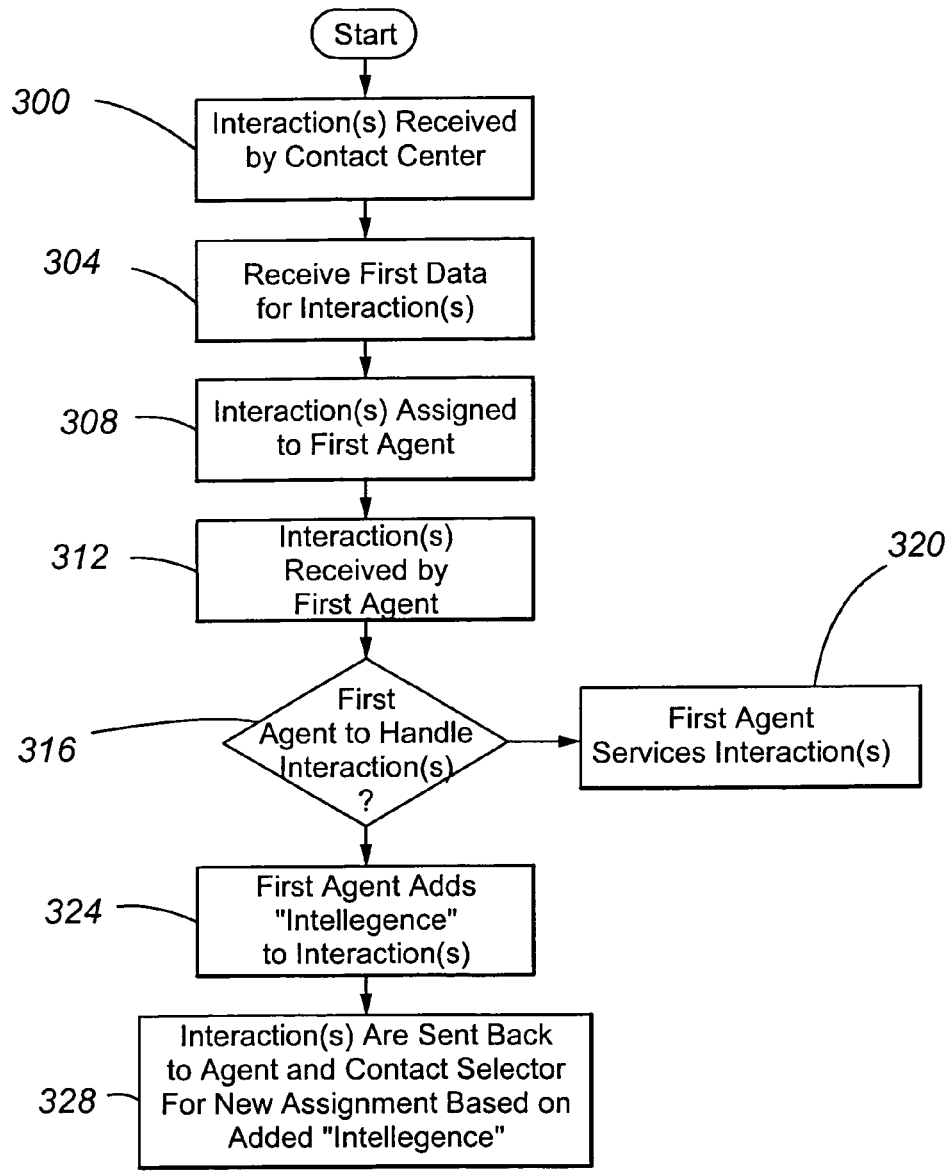
FIG. 3 is a flow chart depicting movement of an interaction(s) in a contact center according to a further embodiment of the present invention.

Referring now to FIG. 3 a flow chart depicting the movement of an interaction or group of interactions is described in accordance with an embodiment of the present invention.

In step 300, an interaction or set of interactions is received in a contact center.

In step 304, the interaction's relatively-easy-to-determine information is acquired by an IVR or a human information collector. This information may include the interaction's origins, content type, skill requirements, service level requirements, customer status, previous interactions escalated by the same customer, etc.

In step 308, a first servicing agent is determined by the agent and contact selector 220 and the interaction assigned to that agent or his/her queue. In the event that the interaction is queued, the interactions may be in a workload list on the agent's workstation or may be simply enqueued telephone calls. The first servicing agent chosen by the agent and contact selector 220 is the best choice as determined by the agent and contact selector 220 given only the easily determined information. For that reason, the "optimal" agent as determined by the agent and contact selector 220, initially may not necessarily be the true optimal agent available to service the interaction in the contact center. The reason that the first servicing agent may not be optimal is that the agent and contact selector 220 was not provided with enough information to make the optimal decision.

In step 312, the first servicing agent receives the interaction or set of interactions. The first servicing agent begins an exchange with at least one of the interactions in his/her work queue and because of these exchanges, (which may only be reading the subject of an email for example) determines information about this particular interaction and any other interaction in his/her work queue that the agent and contact selector 220 did not previously know.

In step 316, the first agent determines if they can handle the given interaction(s) that are currently assigned to him/her. If so, the first agent goes on to service the interaction(s) in step 320. However, if the first agent has identified one or a set of interactions that they cannot handle then the first agent goes on to add "intelligence" to the interaction(s) in step 324. "Intelligence" may be relational information, as described above, for a set of interactions. Additionally, "intelligence" may be providing information to the agent and contact selector 220 that it did not previously have access to, e.g., the customer only wants to speak to a female, what agents other than himself/herself should not be assigned the interaction, the customer will only wait five minutes otherwise they will change companies, etc.

When the first agent adds relational intelligence to the interactions by the methods described above, the agent and contact selector 220 knows that the related interactions should be treated differently than before. In one configuration, the first agent does not necessarily need to provide the agent and contact selector 220 with information as to who the best agent in the contact center would be to handle the interactions. Rather, for example, the additional information may simply be, "I don't care where you send these interactions, but wherever one goes, the others should go there as well." This type of information is very useful to the agent and contact selector 220 because now multiple interactions can be treated as one interaction with multiple pointers to other related interactions.

In step 328, the interactions are sent back to the agent and contact selector 220 for re-routing/transfer with the additional intelligence provided by the first agent.

Figure 4:
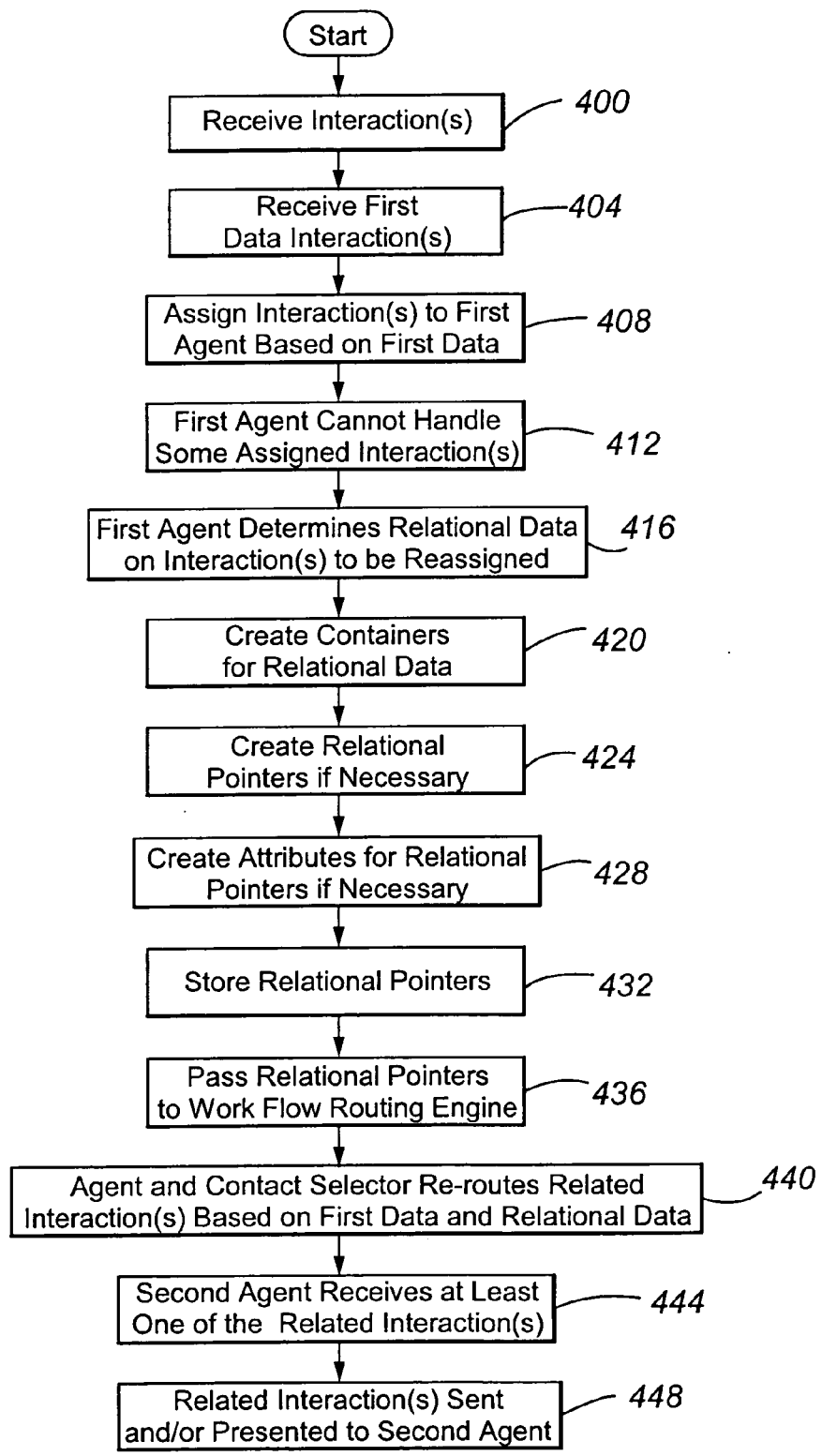
FIG. 4 is a flow chart depicting switch/server logic in accordance with an embodiment of the present invention.
Figure 5:
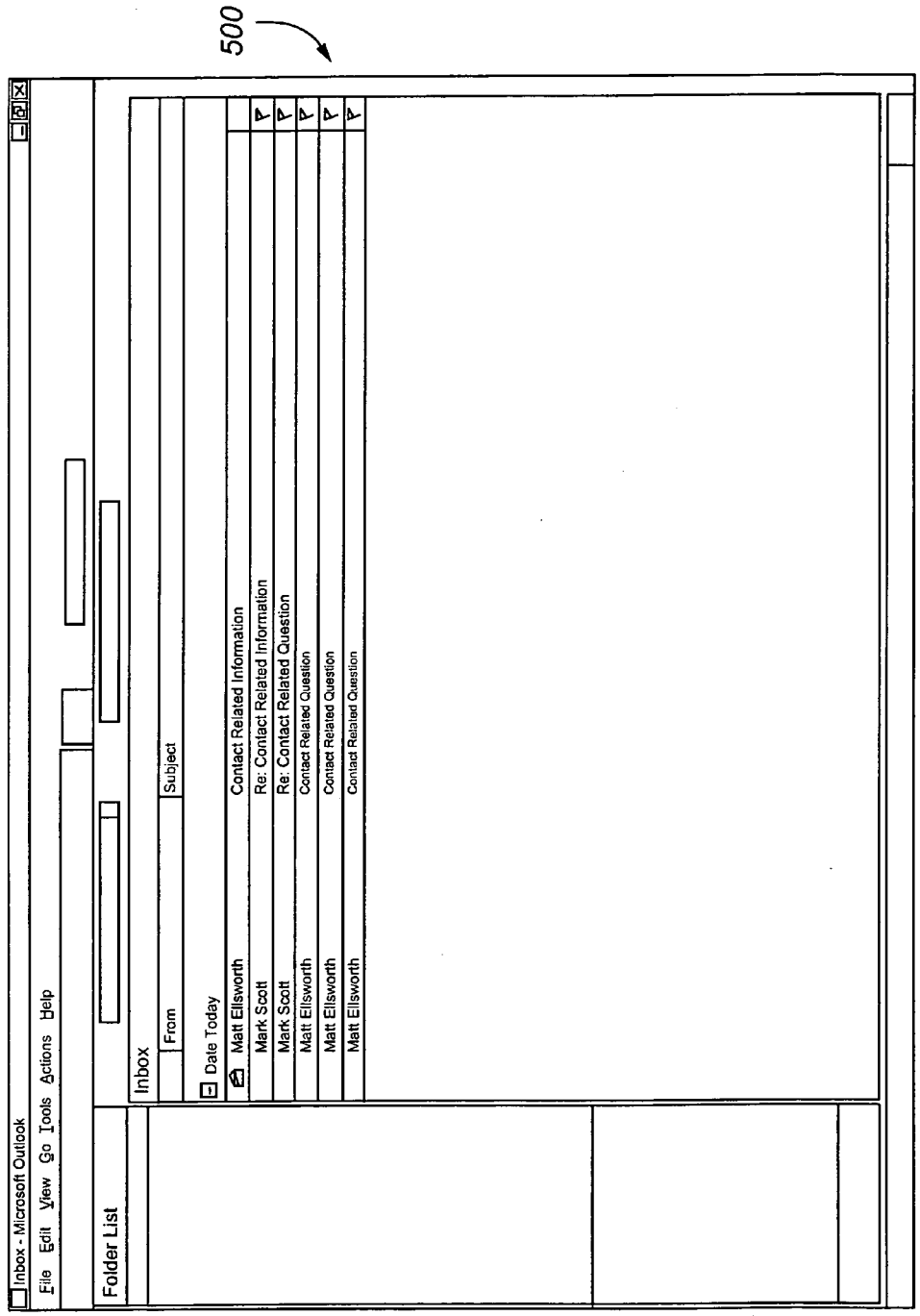
FIG. 5 is a screen shot of an agent's service screen with multiple interactions in accordance with an embodiment of the present invention.

Referring to FIG. 4, the switch/server logic will be explained in accordance with one embodiment of the present invention.

In step 400, an interaction or set of interactions is received by the server 110.

In step 404, relatively-easy-to-determine data is gathered from the given interaction(s), much like in step 304 above. Based on this data the interaction(s) are assigned to a first agent in step 408.

In step 412, the first agent turns out to be unable to handle some or all of the current interaction(s). However, as a result of some sort of exchange between the agent and the interaction(s) additional information, e.g. relational information for a set of interactions, is determined by the servicing agent who then relays that information on to the server 110 in step 416.

In step 420, the EDU containers are created in a way similar to the manner described above. These containers are where any relational pointers are created in step 424. The relational pointers may also have attributes associated with them. If so, those are created in the EDU as well in step 428. Then both the relational pointers and their associated attributes are stored in the EDU in step 432. The relational pointers provide the human deduced intelligence of the first agent back to the agent and contact selector 220 in step 436.

In step 440, the agent and contact selector 220 reroutes the interaction(s) in any one of the manners described above. For instance, in one configuration, related interactions may be treated as a single interaction and will be re-routed/transferred to the same agent or agent queue. Alternatively, related interactions may be spread to multiple agents or agent queues where they can be re-grouped after at least one of them is received by an agent.

In step 444, the interaction or set of interactions is received by the next assigned agent. If the interactions are not already grouped and at the next assigned agent's work station then all other related interactions are sent to the next assigned agent and are presented to him/her at their workstation.

This process can continue if the next assigned agent still cannot handle the given interaction(s) but is able to determine more information about the interaction(s) and possibly their relationship with other interactions. However, the advantage of the present invention is that it is intended to limit the number of re-routes/transfers because the addition of intelligence to the agent and contact selector 220 from the agent before transfer affords the agent and contact selector 220 to make a more informed routing decision.

With reference to FIGS. 5-9, the interactions of an agent with their User Interface (UI) will be discussed in accordance with one embodiment of the present invention.

Figure 6:
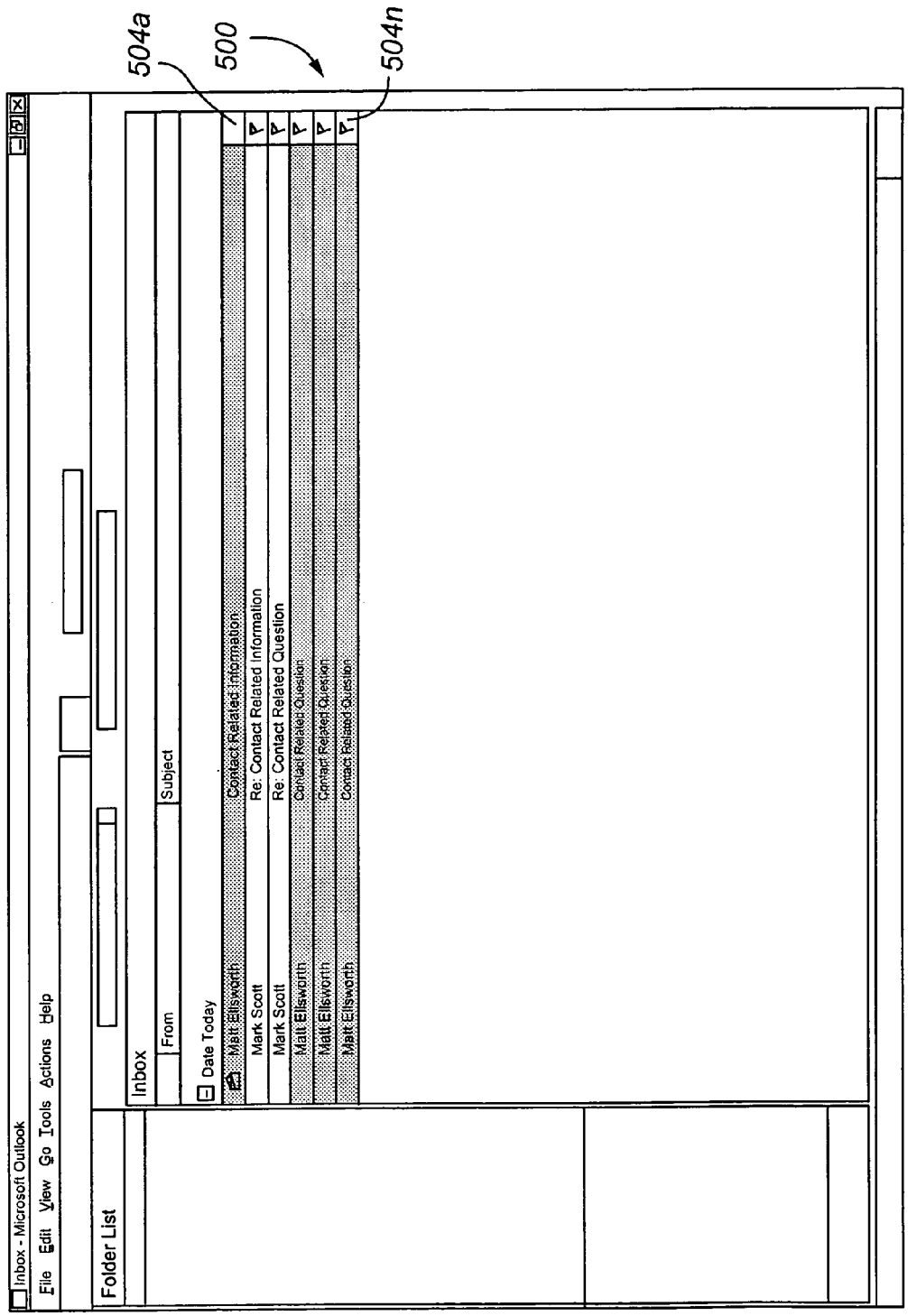
FIG. 6 is another screen shot of an agent's service screen with a subset of the multiple interactions grouped in accordance with still another embodiment of the present invention.
Figure 7:
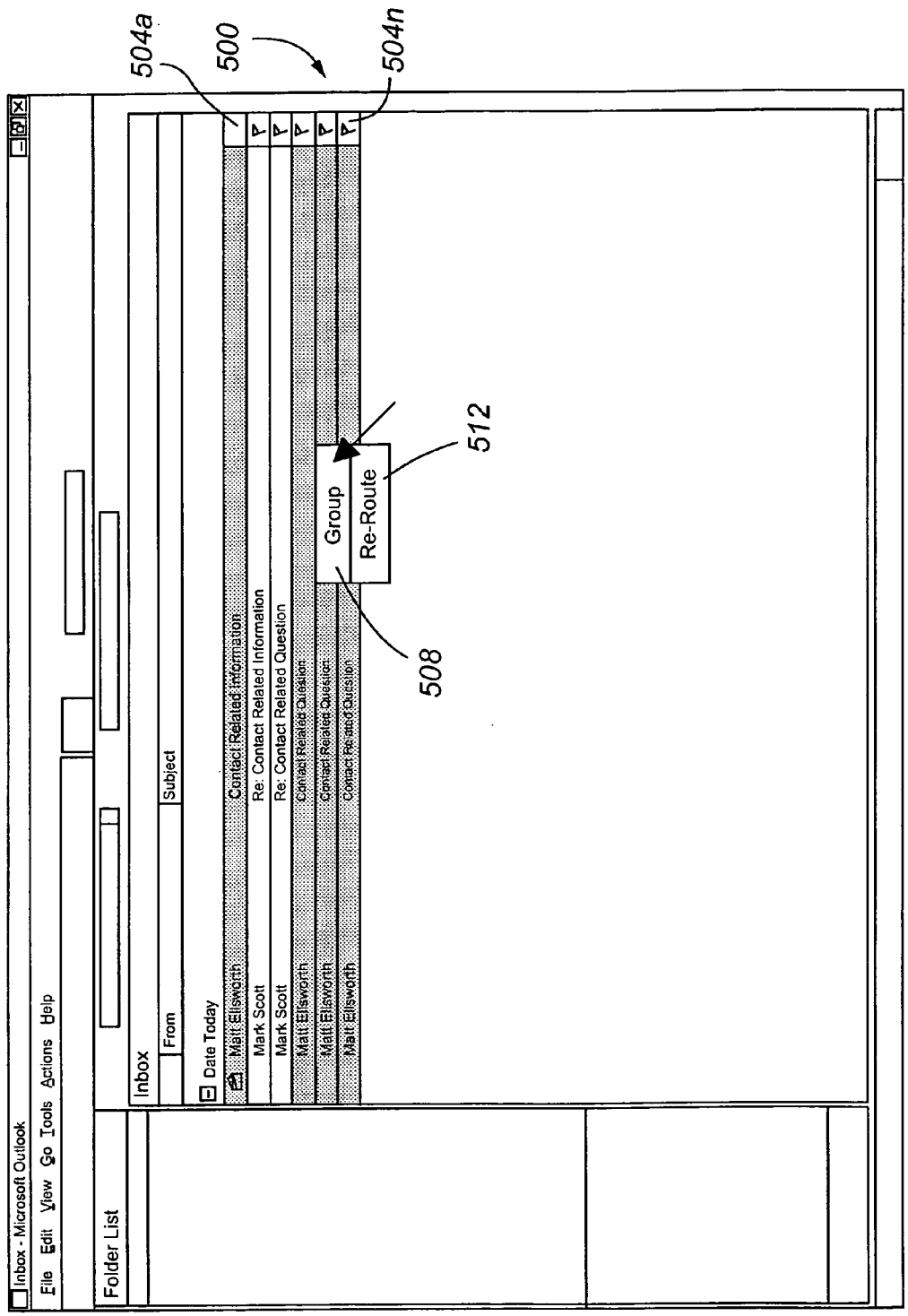
FIG. 7 is yet another screen shot of an agent's service screen with the group command in accordance with a further embodiment of the present invention.
Figure 8:
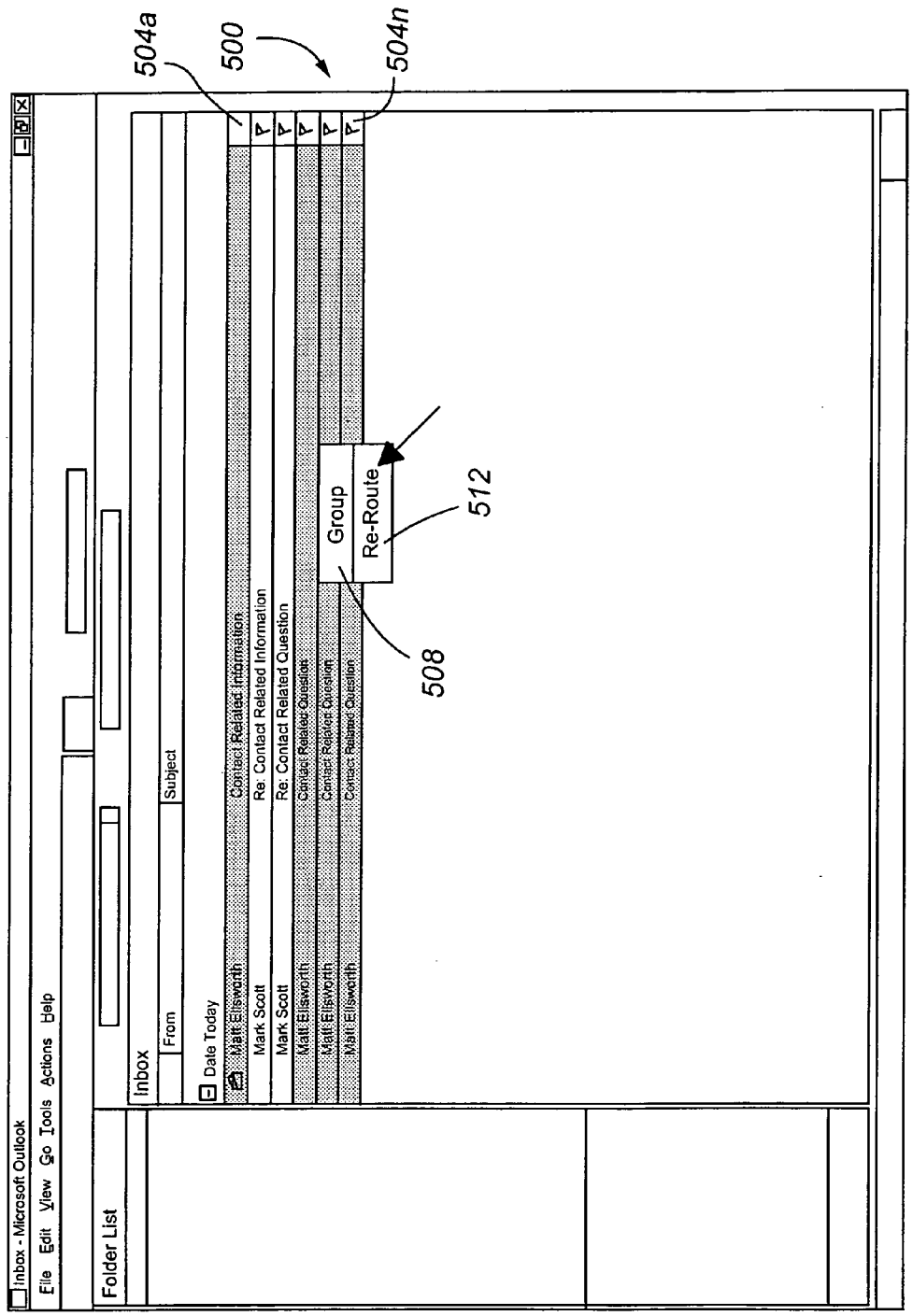
FIG. 8 is still another screen shot of an agent's service screen with the Re-Route command in accordance with embodiments of the present invention.

A set of interactions 500 for servicing has been received and displayed on an assigned agent's workstation. Although the figure shows a graphical UI (GUI), the UI may also be a telephone, smart/wireless PDA, computer desktop, softphone, or the like depending on the type of media that the interactions are in. An agent is able to determine that he/she cannot service a given interaction. However, the agent also realizes that there are multiple related interactions 504a-n that have been assigned to him/her. The interactions may be related because they come from a common source as is shown in FIG. 6. Interactions may also be related for other reasons including they are directed toward common subject matter. If the agent were to send the highlighted interactions back to the agent and contact selector 220 at this point, they may or may not end up being assigned to a common agent, especially because the subject of one of the four highlighted interactions is different and maybe another interaction came from a different email address of the same customer. Regardless of the reason why, when the server 110 goes to re-route/transfer the interactions it would run a routing algorithm for each individual interaction. Fortunately, embodiments of the present invention allow the agent to provide additional information to the agent and contact selector 220 by first selecting the group command 508 and then selecting the Re-Route (or transfer) command 512, as can be seen in FIGS. 7 and 8. When the group command 508 is selected, the relational pointers and their attributes are created in a newly created EDU for some or all of the related interactions. At this point, the agent may be asked by a popup menu to identify a reason for the re-route or transfer request. The menu selections would include "same customer" and "same intent". Then by selecting the Re-Route command 512 the agent and contact selector 220 runs it's routing algorithm and incorporates the newly added information that was provided by the first agent.

As can be appreciated, scenarios were used to describe particular embodiments and configurations of the present invention. Specifically, a "first" agent is assigned to a given interaction to service that interaction. However, it is understood by one skilled in the art, after reading the disclosure, that the "first" agent can be any agent that is assigned to an interaction or set of interactions and then subsequently has that interaction(s) sent back to the agent and contact selector 220 with additional human intelligence. The term "first" agent is not intended, nor should it be construed, to limit the invention to the first agent assigned to an interaction.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for servicing a customer work item, comprising:
    a processor executing a routing engine;
    the routing engine assigning a first work item to a first agent and a second work item to a second agent, wherein the assigning of the first work item to the first agent is based on a first routing decision made by the routing engine;
    the routing engine creating a first data structure for the first work item and a second data structure for the second work item, wherein the first data structure references the second data structure and the second data structure references the first data structure;
    the routing engine sending the first data structure to the first agent and the second data structure to the second agent;
    in response to assigning, the routing engine receiving, from the first agent, a request to re-route the first work item;
    the routing engine receiving, from the first agent, a deductive context associated with the first work item, the deductive context determined at least in part by the first work item being related to the second work item;
    the routing engine analyzing the deductive context;
    the routing engine adjusting the first routing decision to a second routing decision based at least in part on the deductive context associated with the first work item;
    based on the second routing decision, the routing engine automatically re-routing the first and second work items to a common agent.

2. The method of claim 1, wherein the first and second work items are on first and second media types, respectively, and wherein the first and second media types are different.

3. The method of claim 1, further comprising creating a third data structure, wherein the third data structure references both of the first and second data structures.

4. The method of claim 3, wherein the first data structure comprises a relationship pointer identifying the second data structure, wherein the first data structure comprises at least one attribute of the relationship pointer, and wherein the at least one attribute is a reason for the requested re-routing of the first work item.

5. The method of claim 3, wherein the second data structure comprises a relationship pointer identifying the first data structure, wherein the second data structure comprises at least one attribute of the relationship pointer, and wherein the at least one attribute is a reason for the requested re-routing of the first work item.

6. The method of claim 3, wherein the second data structure comprises a relationship pointer identifying the first data structure, wherein the second data structure comprises at least one attribute of the relationship pointer, and wherein the at least one attribute is a reason for the requested re-routing of the first work item.

7. The method of claim 1, wherein the common agent is one of the second agent or a third agent.

8. The method of claim 1, further comprising:
    receiving, from the first agent, a logical grouping comprising the first and second work items.

9. The method of claim 8, wherein the logical grouping is received with the re-route request.

10. A tangible, non-transitory computer readable medium comprising executable instructions operable, when executed by a processor, to perform the steps of claim 1.

11. In a contact center, a tangible, non-transitory computer readable medium comprising processor-executable instructions, the instructions operable to execute:
    a routing engine operable to:
        assign a first work item to a first agent and a second work item to a second agent, wherein the assigning of the first work item to the first agent is based on a first routing decision made by the routing engine;
        create a first data structure for the first work item and a second data structure for the second work item, wherein the first data structure references the second data structure and the second data structure references the first data structure;
        in response to assigning the first and second work items, send the first data structure to the first agent and the second data structure to the second agent;
    a relation awareness agent operable to:
        receive re-route requests from agents prior to the agents initiating servicing of the requests;
        receive a relatedness determination from an agent;
        based on the relatedness determination, generate at least one relatedness pointer in at least the first data structure associated with at least the first work item, the at least one relatedness pointer indicating relatedness between the first and second work items; and
        based on the at least one relatedness pointer, automatically change re-route decisions made by the routing engine;
    wherein at least one of the following is true:
        (i) the first data structure comprises a relatedness pointer to the second data structure;
        (ii) the second data structure comprises a relatedness pointer to the first data structure; and
        (iii) a third data structure comprises first and second relatedness pointers to the first and second data structures, respectively.

12. The computer readable medium of claim 11, wherein the first and second work items are on different media types, wherein the relatedness pointer is an identifier, and wherein the relatedness pointer comprises an attribute, the attribute indicating a reason why the first and second work items are related.

13. The computer readable medium of claim 11, wherein (i) is true.

14. The computer readable medium of claim 11, wherein (ii) is true.

15. The computer readable medium of claim 11, wherein (iii) is true.

16. A method for servicing customer work items, comprising:

a routing engine, executed by a processor, receiving a first work item and a second work item;

the routing engine assigning a first work item to a first agent;

the routing engine creating a first data structure for the first work item, wherein the first data structure references the second work item;

the routing engine sending the first data structure to the first agent;

receiving a determination, from the first agent, that the first work item is related to the second work item;

receiving an assignment, by the first agent, of a deductive context to at least one of the first and second work items indicating the relationship between the first and second work items;

receiving again, at the routing engine, the first work item, the first work item having the deductive context assigned thereto; and the routing engine re-routing both the first and second work items to a second agent based at least in part on the deductive context assigned thereto.

17. The method of claim 16, wherein the deductive context comprises a description of the relationship between the first and second work items.

18. The method of claim 17, wherein the relationship is at least one of a common source, a common subject, a desired agent, and a request of a customer.

19. The method of claim 16, further comprising:

the first agent assigning the deductive context to the first work item by grouping the first and second work items together.

20. A tangible, non-transitory computer readable medium comprising executable instructions to perform, when executed by a processor, the steps of claim 16.

* * * * *